(12) United States Patent
Chen et al.

(10) Patent No.: US 7,151,440 B2
(45) Date of Patent: Dec. 19, 2006

(54) WIRELESS VEHICLE BURGLAR-ALARM SYSTEM

(75) Inventors: Kuo-Rong Chen, Banciao (TW);
Chun-Chung Lee, Taipei (TW);
Cheng-Hung Huang, Gongguan Township, Miaoli County (TW)

(73) Assignee: Sin Etke Technology Co., Ltd., Taipei (TW)

( * ) Notice: Subject to any disclaimer, the term of this patent is extended or adjusted under 35 U.S.C. 154(b) by 273 days.

(21) Appl. No.: 10/950,390

(22) Filed: Sep. 28, 2004

(65) Prior Publication Data

US 2005/0258945 A1 Nov. 24, 2005

(30) Foreign Application Priority Data

May 24, 2004 (TW) ................................ 93114656 A

(51) Int. Cl.
*B60R 25/10* (2006.01)
(52) U.S. Cl. ................................ 340/426.1; 340/426.2
(58) Field of Classification Search ............. 340/426.1, 340/426.2, 996; 455/410, 404.1, 404.2, 456.1
See application file for complete search history.

(56) References Cited

U.S. PATENT DOCUMENTS 5,223,844 A * 6/1993 Mansell et al. ........ 342/357.07
5,898,391 A * 4/1999 Jefferies et al. ............. 340/988

* cited by examiner

*Primary Examiner*—Daniel Wu
*Assistant Examiner*—Travis R. Hunnings
(74) *Attorney, Agent, or Firm*—Bacon & Thomas, PLLC

(57) ABSTRACT

A wireless vehicle burglar-alarm system formed of an on-board main unit and a wireless communication is disclosed. The on-board main unit obtains the CGI (Cell Global Identity) of a wireless communication base station from its broadcast and stores the CGI in a memory, and sends a re-location signal to the on-board main unit when the storage CGI is changed during an alert mode of the on-board main unit, causing the on-board main unit to start the at least one alarm. The on-board main unit sends an alarm signal to an alarm and drives the wireless communication apparatus to send an alarm message to the car owner wirelessly upon detection of an abnormal condition of the car through a sensor.

7 Claims, 3 Drawing Sheets

WIRELESS VEHICLE BURGLAR-ALARM SYSTEM

BACKGROUND OF THE INVENTION

1. Field of the Invention

The present invention relates to a vehicle burglar-alarm system and more particularly, to a wireless vehicle burglar-alarm system.

2. Description of Related Art

In order to protect against thieves or accidental conditions, a car owner may install a vehicle burglar-alarm system in the car. When leaved the car, the car owner initiates the vehicle burglar-alarm system, driving a set of sensors to detect different locations inside the car.

When an abnormal condition occurred, for example, when a person intruded into the car, the respective sensor is induced to turn on the alarm, causing the alarm to produce a loud and sharp sound to threaten the thief or to call the car owner to the parking place.

The loud and sharp sound of the alarm of a conventional vehicle burglar-alarm system may effectively threaten a thief, however it may be not hearable to the car owner who is far away from the parking place. In this case, the car owner cannot take the necessary measures. Further, when a wrecker is removing the car from the parking place, the car owner cannot know the situation even if the alarm of the vehicle burglar-alarm system is initiated. In this case, the car owner knows the fact that the car was removed by a wrecker only when returned to the parking place. These problems occurred just because the vehicle burglar-alarm system does not have the function of actively informing the car owner of any abnormality of the car on the real time. Further, the loud sharp sound of the alarm of a vehicle burglar-alarm system produces a noise to the surrounding.

Therefore, it is desirable to provide a wireless vehicle burglar-alarm system that eliminates the aforesaid problems.

SUMMARY OF THE INVENTION

The present invention has been accomplished under the circumstances in view. It is therefore the main object of the present invention to provide a wireless vehicle burglar-alarm system, which automatically detects the presence of base stations within the communication range and stores in a memory the individual CGI (Cell Global Identity) of each detected base station so as to actively inform the owner of the car of the status of the car when the storage CGI data is changed. It is another object of the present invention to provide a wireless vehicle burglar-alarm system, which automatically informs the owner of the car of any abnormality of the car, enabling the owner of the car to know the status of the car on time.

To achieve these and other objects of the present invention, the wireless vehicle burglar-alarm system comprises an on-board main unit installed in a car and electrically connected to at least one sensor and at least one alarm in the car, each said sensor being adapted to detect an abnormal status of a predetermined location in the car and to produce an abnormality signal upon detection of an abnormal status of the predetermined location, the on-board main unit being adapted to receive the abnormality signal from each sensor and to control the at least one alarm to produce an alarm signal upon reception of the abnormality signal; and a wireless communication apparatus installed in the car and electrically connected to the on-board main unit and adapted to receive the broadcast of at least one base station of one wireless communication system and to store the Cell Global Identity of each base station of the wireless communication system. When the on-board main unit is on an alert status and when one stored Cell Global Identity is disappeared from the wireless communication apparatus and the wireless communication apparatus has the Cell Global Identity of one new base station stored therein, the wireless communication apparatus sends a relocation signal to the on-board main unit, causing the on-board main unit to start the at least one alarm.

DETAILED DESCRIPTION OF THE PREFERRED EMBODIMENT

Figure 1:
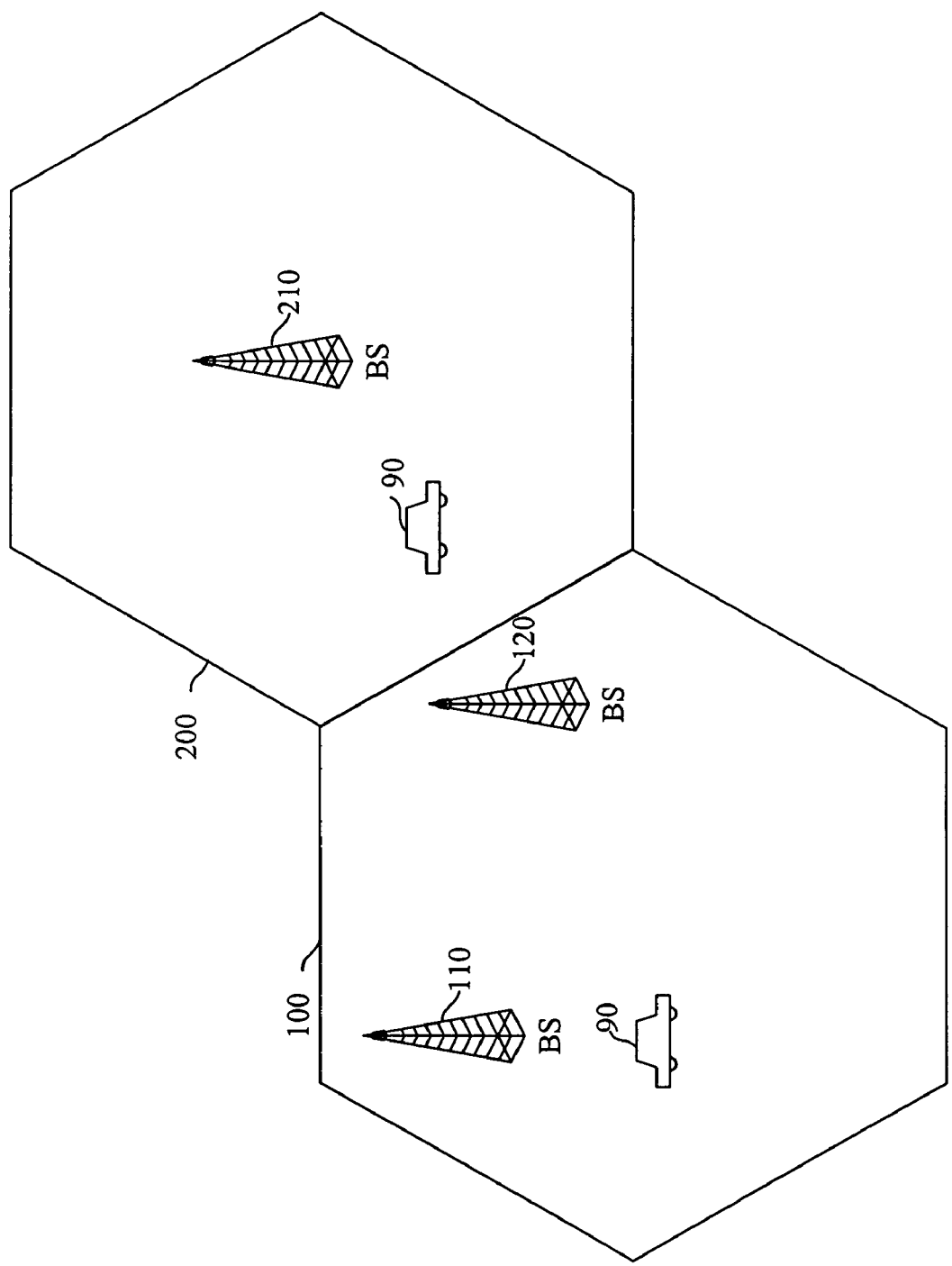
FIG. 1 is a schematic drawing showing the operation environment of the present invention.
Figure 2:
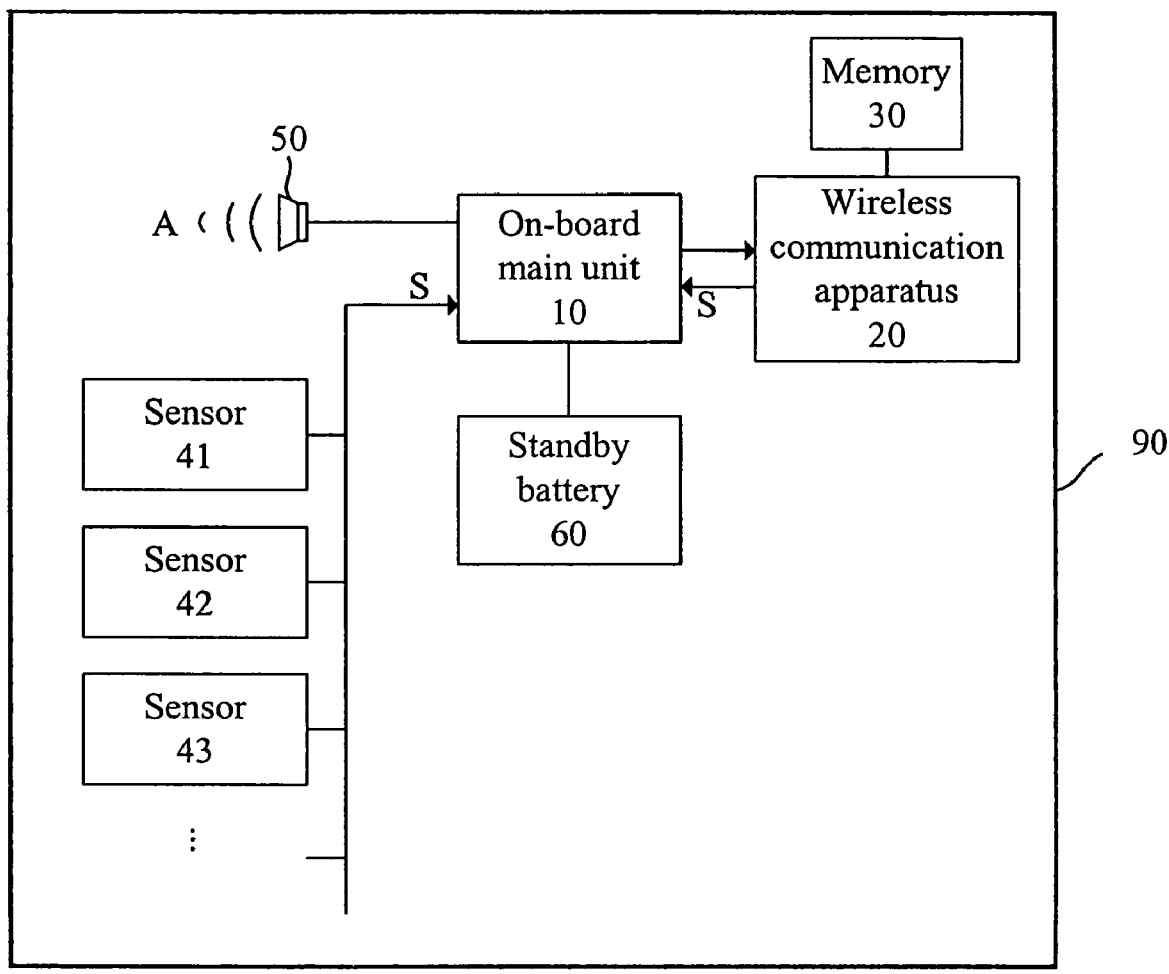
FIG. 2 is a system block diagram of the present invention.

Referring to FIGS. 1 and 2, a wireless vehicle burglar-alarm system in accordance with the present invention is used in a car 90, comprised of an on-board main unit 10, a wireless communication apparatus 20, and a memory 30. The on-board main unit 10 and the wireless communication apparatus 20 are electrically connected to each other. The memory 30 is coupled to the wireless communication apparatus 20.

A set of sensors 41~43 and an alarm speaker 50 are installed in the car 90 and electrically connected to the on-board main unit 10. The sensors 41~43 can be a door sensor, ignition switch sensor, trunk lid sensor, or the like. When an abnormal condition occurred at one of the set locations after the wireless vehicle burglar-alarm system was initiated, for example, when the door of the car 90 is opened abnormally or when an external body is inserted into the ignition switch of the car 90 during alert status of the car 90, the respective sensor gives an abnormality signal S to the on-board main unit 10. Upon receipt of the abnormality signal S, the on-board main unit 10 immediately drives the alarm speaker 50 to produce a warning sound A, informing the car owner of an abnormal status of the car 90.

Figure 3A:
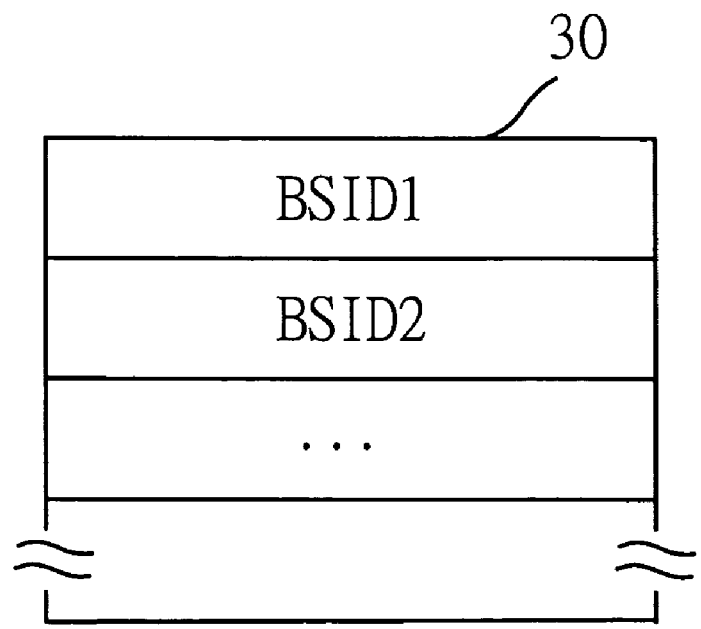
FIG. 3A is a schematic drawing showing a CGI (Cell Global Identity) data stored in the memory of the wireless vehicle burglar-alarm system according to the present invention.

After the car 90 entered a Local Area (LA) 100, the wireless communication apparatus 20 can know from the message of the broadcast of the Broadcast Control Channel (BCCH) of one base station (BS) 110 in the Local Area (LA) 100 whether the car 90 has moved to a new location. If detected a location change of the car 90, the wireless communication apparatus 20 immediately advises a Visitor Location Register (VLR) (not shown) to make a registration via a Stand Along Dedicated Control Channel (SDCCH). After registration, the wireless communication apparatus 20 obtains a Location Area Identity (LAI) and a Cell Identity (CI) from a Cell Global Identity (CGI) in the broadcast of the base station 110. The wireless communication apparatus 20 will search all surrounding base stations (for example, the base station 120), and determine the usability of the searched surrounding base stations by means of the Cell Global Identity (CGI). In general, when entered a new Local Area (LA) 100, the wireless communication apparatus 20 must advise a Visitor Location Register (VLR) (not shown), enabling the system to know the current location of the wireless communication apparatus 20. This action is called the registration. Therefore, when the wireless communication apparatus 20 entered a new Local Area (LA) 100, the wireless communication apparatus 20 stores in the memory 30 the respective CGI of the base stations 110, 120 within the Local Area (LA) 100. As shown in FIG. 3A, DSID1 is the CGI of the base station 110, DSID2 is the CGI of the base station 120.

After parking of the car 90, the on-board main unit 10 enters an alert mode and sends a locking signal to the wireless communication apparatus 20, driving the wireless communication apparatus 20 to lock the respective cell identities of the base stations 110, 120. Thereafter, the wireless communication apparatus 20 make re-registration periodically to the net subject to GSM regulations. The re-registration cycle can be within 6 minutes to 24 hours.

As shown in FIG. 3, the memory 30 has the CGIs (Cell Global Identities) of the base stations 110, 120. However, the wireless communication apparatus 20 may miss the signal of the base station 120 during re-registration due to weather or other reasons even when the car 90 is parked. At this time, the memory 30 has only the CGI of the base station 110. Therefore, when the number of base stations contained in the memory 30 is reduced, the content of the memory 30 is relatively changed. However, the wireless communication apparatus 20 does not give a relocation signal to the on-board main unit 10, preventing a false action.

Figure 3B:
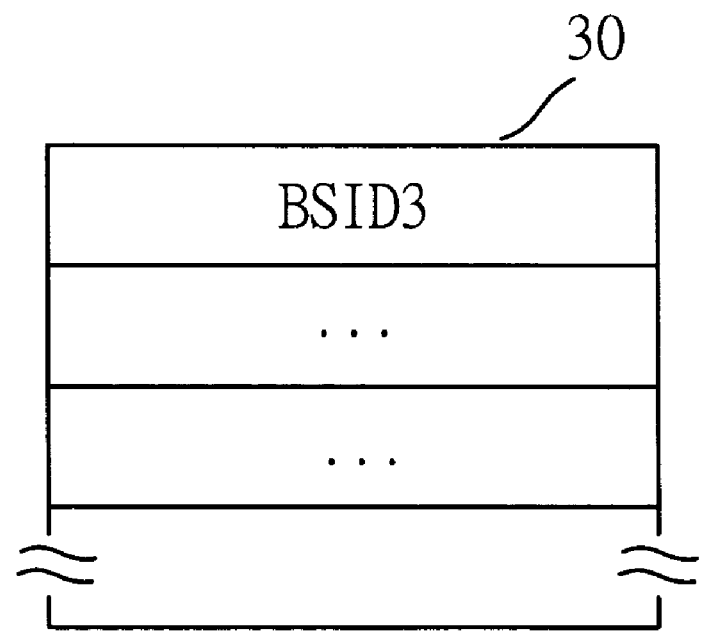
FIG. 3B is similar to FIG. 3A but showing the storage CGI data changed.

If the car 90 is stolen or dragged to another Local Area (LA) 200 during an alert mode of the on-board main unit 10, the wireless communication apparatus 20 detects the location change. Upon detection of the location change, the wireless communication apparatus 20 make a registration subject to GSM regulations. At this time, the wireless communication apparatus 20 advises a Visitor Location Register (CLR) to make registration via a Stand Along Dedicated Control Channel (SDCCH). After registration, the wireless communication apparatus 20 obtains the CGI of the base station 210 and stores the CGI of the base station 210 in the memory 30. As shown in FIG. 3B, the CGI of the base station 210 is BSID3. At this time, the locking signal is initiated, the previously stored CGIs (BSID1, BSI2) was not in, and a new CGI (DSID3) is in presence, therefore it is concluded that the car 90 has been stolen and moved to or dragged to another Local Area (LA) 200, and the wireless communication apparatus 20 sends a relocation signal to the on-board main unit 10. Upon receipt of the relocation signal, the on-board main unit 10 immediately drives the alarm speaker 50 to produce a warning sound A, informing the car owner of an abnormal status of the car 90. In addition to controlling the alarm speaker 50 to produce a warning sound A, the on-board main unit 10 sends an alarm signal to the wireless communication apparatus 20, causing the wireless communication apparatus 20 to sends an alarm signal to a communication address assigned by the owner of the car. The wireless communication apparatus 20 can be a GPRS cellular telephone, GSM, PDA, etc. The alarm signal A can be a short message, chunk, fax message, e-mail, or the like. The communication address assigned by the owner of the car can be the telephone number of the wireless communication apparatus 20, or the home telephone number, office telephone number, fax number, or e-mail address of the owner of the car.

When on an alert status, the on-board main unit 10 can periodically read CGI (Cell Global Identity from the memory 30 for making a comparison. If a previously stored CGI is disappeared and a new CGI is in presence, the on-board main unit 10 immediately controls the alarm speaker 50 to produce a warning sound, informing the car owner of an abnormal status of the car 90.

The wireless vehicle burglar alarm system further comprises a standby battery 60 electrically connected to the on-board main unit 10 and the wireless communication apparatus 20 and adapted to provide the necessary working voltage when the car battery is low.

Although the present invention has been explained in relation to its preferred embodiment, it is to be understood that many other possible modifications and variations can be made without departing from the spirit and scope of the invention as hereinafter claimed.

What is claimed is:

1. A wireless vehicle burglar-alarm system comprising:
    an on-board main unit installed in a car and electrically connected to at least one sensor and at least one alarm in said car, each said sensor being adapted to detect an abnormal status of a predetermined location in said car and to produce an abnormality signal upon detection of an abnormal status of said predetermined location, said on-board main unit being adapted to receive said abnormality signal from each said sensor and to control said at least one alarm to produce an alarm signal upon receive of said abnormality signal; and
    a wireless communication apparatus installed in said car and electrically connected to said on-board main unit and adapted to receive the broadcast of at least one base station of one wireless communication system and to store the Cell Global Identity of each base station of said wireless communication system;
    wherein when said on-board main unit is in an alert mode and when one stored Cell Global Identity is disappeared from said wireless communication apparatus and said wireless communication apparatus has the Cell Global Identity of one new base station stored therein, said wireless communication apparatus sends a relocation signal to said on-board main unit, causing said on-board main unit to start said at least one alarm.

2. The wireless vehicle burglar-alarm system as claimed in claim 1, further comprising a memory coupled to said wireless communication apparatus for storing the Cell Global Identity of each base station of said wireless communication system.

3. The wireless vehicle burglar-alarm system as claimed in claim 1, wherein said at least one alarm each is an alarm speaker.

4. The wireless vehicle burglar-alarm system as claimed in claim 1, wherein said at least one alarm is connectable to an assigned communication address wirelessly.

5. The wireless vehicle burglar-alarm system as claimed in claim 4, wherein said assigned communication address is a cellular telephone number.

6. The wireless vehicle burglar-alarm system as claimed in claim 1, wherein said alarm signal is a short message.

7. The wireless vehicle burglar-alarm system as claimed in claim 1, wherein said wireless communication apparatus is a cellular telephone.

* * * * *